US009659087B2

(12) United States Patent
Cazzanti et al.

(10) Patent No.: US 9,659,087 B2
(45) Date of Patent: May 23, 2017

(54) UNSUPERVISED PRIORITIZATION AND VISUALIZATION OF CLUSTERS

(71) Applicant: GLOBYS, INC., Seattle, WA (US)

(72) Inventors: Luca Cazzanti, Seattle, WA (US); Courosh Mehanian, Redmond, WA (US); Julie Penzotti, Seattle, WA (US); Oliver Downs, Redmond, WA (US); Doug Scott, Seattle, WA (US)

(73) Assignee: Amplero, Inc., Seattle, WA (US)

( * ) Notice: Subject to any disclaimer, the term of this patent is extended or adjusted under 35 U.S.C. 154(b) by 587 days.

(21) Appl. No.: 13/831,121

(22) Filed: Mar. 14, 2013

(65) Prior Publication Data
US 2014/0143249 A1 May 22, 2014

Related U.S. Application Data

(60) Provisional application No. 61/728,100, filed on Nov. 19, 2012.

(51) Int. Cl.
*G06F 17/30* (2006.01)
(52) U.S. Cl.
CPC .. *G06F 17/30705* (2013.01); *G06F 17/30572* (2013.01); *G06F 17/30713* (2013.01)
(58) Field of Classification Search
CPC .................................................. G06F 17/30713
See application file for complete search history.

(56) References Cited

U.S. PATENT DOCUMENTS

| 5,832,470 | A  | * | 11/1998 | Morita et al. | |
|---|---|---|---|---|---|
| 6,460,036 | B1 | * | 10/2002 | Herz | 707/748 |
| 6,523,026 | B1 | * | 2/2003 | Gillis | |
| 7,158,986 | B1 | * | 1/2007 | Oliver et al. | |

(Continued)

FOREIGN PATENT DOCUMENTS

EP           1890257 A2     2/2008

OTHER PUBLICATIONS

Coates et al., "An Analysis of Single-Layer Networks in Unsupervised Feature Learning", 2011, Journal of Machine Working Research, Workshop & Conference Proceedings, vol. 15.*

(Continued)

*Primary Examiner* — Apu Mofiz
*Assistant Examiner* — Sheryl Holland
(74) *Attorney, Agent, or Firm* — Seed IP Law Group LLP

(57) ABSTRACT

Techniques are disclosed that automatically identify and order the most differentiated clusters from a given collection of clusters within a dataset. A measure of dissimilarity is computed for each cluster from a defined reference cluster, and the clusters are ordered according to the chosen dissimilarity. At least N clusters are selected as the most differentiated clusters relative to the defined reference. Within each cluster, the top-M most distinguishing cluster attributes can be automatically identified by an analogous process that computes the dissimilarity of each cluster attribute to its corresponding attribute in the reference cluster, and orders the attributes by dissimilarity. This then allows for automatic surfacing of what it is about a cluster that differentiates its members relative to the population as a whole, and to provide insight on what action or treatment might be made to address that specific segment of the underlying population.

20 Claims, 9 Drawing Sheets

(56) References Cited

U.S. PATENT DOCUMENTS

| | | | |
|---|---|---|---|
| 7,599,945 B2 | 10/2009 | Ames et al. | |
| 2003/0018652 A1* | 1/2003 | Heckerman et al. | 707/104.1 |
| 2003/0037041 A1* | 2/2003 | Hertz | 707/1 |
| 2003/0177103 A1* | 9/2003 | Ivanov et al. | 705/400 |
| 2004/0064449 A1* | 4/2004 | Ripley et al. | 707/5 |
| 2004/0080510 A1* | 4/2004 | Inokuchi et al. | 345/440 |
| 2005/0203924 A1* | 9/2005 | Rosenberg | 707/100 |
| 2007/0094609 A1* | 4/2007 | Gilboa et al. | 715/762 |
| 2007/0143132 A1* | 6/2007 | Linne et al. | 705/1 |
| 2007/0239636 A1* | 10/2007 | Tang et al. | 706/20 |
| 2007/0271265 A1* | 11/2007 | Acharya et al. | 707/6 |
| 2007/0271287 A1* | 11/2007 | Acharya et al. | 707/101 |
| 2007/0271291 A1* | 11/2007 | Acharya | 707/102 |
| 2007/0282775 A1* | 12/2007 | Tingling | 706/45 |
| 2008/0015936 A1* | 1/2008 | Bibelnieks et al. | 705/14 |
| 2008/0046430 A1 | 2/2008 | Niekamp | |
| 2008/0133567 A1 | 6/2008 | Ames et al. | |
| 2008/0162098 A1* | 7/2008 | Suarez-Rivera et al. | 703/10 |
| 2008/0243776 A1* | 10/2008 | Brunner et al. | 707/3 |
| 2008/0256442 A1* | 10/2008 | Sinha et al. | 715/273 |
| 2008/0305965 A1* | 12/2008 | Moorhouse et al. | 506/16 |
| 2009/0013270 A1* | 1/2009 | Helfman et al. | 715/764 |
| 2009/0248607 A1* | 10/2009 | Eggink | G06F 17/3087 706/54 |
| 2009/0287503 A1* | 11/2009 | Angell et al. | 705/3 |
| 2010/0287160 A1 | 11/2010 | Pendar | |
| 2010/0313157 A1 | 12/2010 | Carlsson et al. | |
| 2011/0029526 A1* | 2/2011 | Knight et al. | 707/737 |
| 2011/0082636 A1 | 4/2011 | Barker et al. | |
| 2011/0178848 A1* | 7/2011 | Rane et al. | 705/7.31 |
| 2011/0202886 A1* | 8/2011 | Deolalikar et al. | 715/853 |
| 2011/0208741 A1* | 8/2011 | Brueckner | 707/738 |
| 2011/0238408 A1* | 9/2011 | Larcheveque et al. | 704/9 |
| 2011/0302162 A1* | 12/2011 | Xiao et al. | 707/724 |
| 2012/0110071 A1* | 5/2012 | Zhou et al. | 709/204 |
| 2012/0150425 A1 | 6/2012 | Chapman et al. | |
| 2012/0254183 A1 | 10/2012 | Ailon et al. | |
| 2013/0189947 A1* | 7/2013 | Kovacs et al. | 455/406 |

OTHER PUBLICATIONS

H. Valpola, "Bayesian Ensemble Learning for Nonlinear Factor Analysis", 2000, Finnish Academies of Technology, pp. 26-30.*

International Search Report and Written Opinion for International Patent Application No. PCT/US2013/070524 mailed Feb. 27, 2014.

"Applied Clustering Techniques," SAS Institute, Inc., 2005, 4 pages http://support.sas.com/edu/schedules.html?ctry=us&id=1446.

"Carrot Search: Circles: Multi-level Interactive Pie Chart," Carrot Search, Jun. 28, 2010, 1 page http://carrotsearch.com/circles-overview.html.

"Graphical (Data Visualization) EDA Techniques" StatSoft Electronic Statistic Textbook, 2013, 3 pages http://www.statsoft.com/textbook/data-mining-techniques.

"Individual Customer Lifecycle Management (iCLM)" pontis.com, Feb. 20, 2013, 2 pages http://www.pontis.com/solution/iclm.

St. Clair, C., "Finding the Most Useful Clusters: Clustering and the Usefulness Metric," Between Data Science and Applied Data Analysis, M. Schader et al. (eds.), 2003, pp. 483-491.

* cited by examiner

UNSUPERVISED PRIORITIZATION AND VISUALIZATION OF CLUSTERS

CROSS-REFERENCE TO RELATED APPLICATIONS

This non-provisional patent application claims the benefit at least under 35 U.S.C. §119(e) of U.S. provisional patent application Ser. No. 61/728,100 filed on Nov. 19, 2012, entitled "Unsupervised Prioritization and Visualization of Clusters," which is incorporated herein by reference.

TECHNICAL FIELD

The present invention relates generally to providing data analysis and, more particularly, but not exclusively to mechanisms of identifying and ordering for display interesting and important groups, or clusters, from a collection of candidate groups, or clusters, within a dataset.

BACKGROUND

The dynamics in today's telecommunications market are placing more pressure than ever on networked services providers to find new ways to compete. With high penetration rates and many services nearing commoditization, many companies have recognized that it is more important than ever to find new ways to bring the full and unique value of the network to their customers. In particular, these companies are seeking new solutions to help them more effectively up-sell and/or cross-sell their products, services, content, and applications, successfully launch new products, and create long-term value in new business models.

One traditional approach for marketing a particular product or service to telecommunications customers includes broadcasting a variety of generic offerings to customers to see which ones are popular. However, providing these mass marketing product offerings to a customer may significantly reduce the likelihood that the product will be purchased. It may also result in marketing overload for a customer. Therefore many vendors seek better approaches to marketing their products to their customers. Some other approaches include performing various types of analysis on customer data to try to better understand a customer's needs. However, because customers tend to be described by a large number of characteristics, it is often difficult to determine how to classify and/or otherwise identify customers based on this large number of characteristics. This may be especially valid where some customers might not be adequately described by a same set of characteristics as another customer. Thus, even selecting which characteristics are relevant for analysis of a customer or group of customers may quickly become overwhelming. Therefore, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
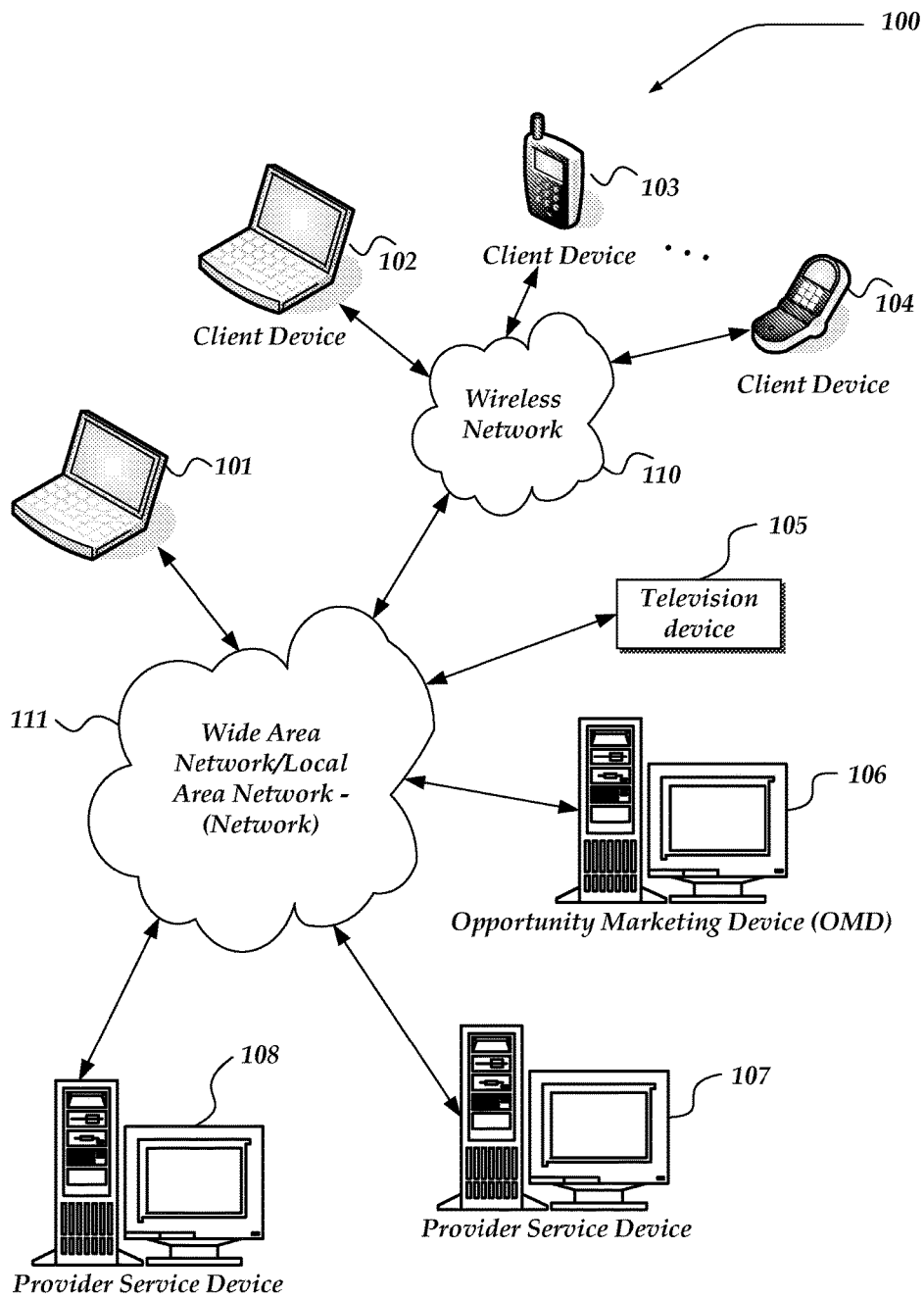
FIG. 1 is a system diagram of one embodiment of an environment in which the techniques may be practiced.

The present techniques now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The various occurrences of the phrase "in one embodiment" as used herein do not necessarily refer to the same embodiment, though they may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "customer" and "subscriber" may be used interchangeably to refer to an entity that has or is predicted to in the future make a procurement of a product, service, content, and/or application from another entity. As such, customers include not just an individual but also businesses, organizations, or the like. Further, as used herein, the term "entity" refers to a customer, subscriber, or the like.

As used herein, the terms "networked services provider", "telecommunications", "telecom", "provider", "carrier", and "operator" may be used interchangeably to refer to a provider of any network-based telecommunications media, product, service, content, and/or application, whether inclusive of or independent of the physical transport medium that may be employed by the telecommunications media, products, services, content, and/or application. As used herein, references to "products/services," or the like, are intended to include products, services, content, and/or applications, and is not to be construed as being limited to merely "products and/or services." Further, such references may also include scripts, or the like.

As used herein, the terms "optimized" and "optimal" refer to a solution that is determined to provide a result that is considered closest to a defined criteria or boundary given one or more constraints to the solution. Thus, a solution is considered optimal if it provides the most favorable or desirable result, under some restriction, compared to other determined solutions. An optimal solution therefore, is a solution selected from a set of determined solutions.

As used herein, the terms "offer" and "offering" refer to a networked services provider's product, service, content, and/or application for purchase by a customer. An offer or offering may be presented to the customer using any of a variety of mechanisms. Thus, the offer or offering is independent of the mechanism by which the offer or offering is presented.

The following briefly describes the embodiments in order to provide a basic understanding of some aspects of the techniques. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations disclosed herein provides a systematic and repeatable approach to identifying and ordering interesting and important groups from within a given collection of groups or clusters within a dataset. The dataset is received along with a grouping for entities within the dataset. A reference cluster is then defined either based on at least some of the entities within the dataset, or based in part on entities from another dataset. A measure of dissimilarity is then computed for each group (herein also referred to as a cluster) from the reference cluster. Each cluster is ordered by dissimilarity, and at least N clusters from the ordered clusters are selected and defined as a most important set of clusters. Each cluster in the dataset is represented as a set of numerical vectors that can be interpreted as probability mass functions or probability density functions over one or more characteristics. In some embodiments, the dissimilarity measure compares a distribution of a cluster's characteristics to their counterparts in the reference cluster. In one embodiment of the invention, a Kullback-Leibler (KL) divergence is adopted as the measure of dissimilarity with the reference cluster being a union of all the clusters in the dataset being considered. In some embodiments, an aggregated dissimilarity measure for each cluster is the mean of the KL-divergences between the representative distributions and their reference cluster counterparts. In other embodiments, the clusters have alternative representations, such as heterogeneous (numerical and non-numerical) vectors, and the corresponding measure of dissimilarity is domain-specific. The dissimilarity comparison may be applied to the entire set of vectors that characterize a cluster, or to selected subsets, which provides a flexible and principled approach for identifying and ordering the subsets of cluster characteristics that most contribute to the overall cluster dissimilarity. The dissimilarity comparison may be applied to attributes (characteristics) that are distinct from the set of attributes that are used for clustering, or they can be applied to a set of attributes that are a combination of attributes used for clustering and attributes not used for clustering. Moreover, using results from the above, various displays are presented to a user to provide visualization on the ordering of the clusters, and/or characteristics of importance within a given cluster, or even for a given entity within a cluster.

Clustering is one mechanism that is directed towards dividing a dataset into meaningfully cohesive groups. It is often used in a variety of areas, including for example, in market research, which seeks to identify groups of consumers who share certain common characteristics. Nowadays, clustering is often performed via computer programs that can handle large numbers of samples and clusters and act on a large number of attributes. After the clustering is done by machines, humans may still be needed to further prioritize the clusters to gain further insight into their composition. The high dimensionality of clusters may make this analysis and visualization challenging for humans. Furthermore, profiling the clusters according to their attributes and determining their importance is often still left to human decision makers who often must resort to heuristics and subjective criteria which can lead to sub-optimal cluster selection. Therefore, the subject innovations disclosed herein are directed towards these challenges, and others, by providing a framework for visualizing and comparing the clusters that scales to large number of samples and clusters and is further dimensionality-independent. The innovations are directed towards being able to be applied to a sub-set of the cluster attributes or to all attributes; thereby allowing the selection and visualization of the subset of cluster attributes that carry discriminative information. The subject innovations are further directed towards providing a framework for objectively measuring an importance of the clusters via mathematical measures, such as measures of dissimilarity between cluster attributes, and for providing a framework for objectively ordering clusters.

In one embodiment, the dataset may comprise entities that represent telecommunication customers, where the customers' characteristics may be obtained from one or more telecommunication providers. However, other datasets may also benefit from the subject innovations disclosed herein. For example, banking industries, cable television industries, retailers, wholesalers, or virtually any other industry in which that industry's customers interact with the services and/or products offered by a provider within that industry. However, it is further noted that the subject innovations disclosed herein are not constrained to providing an offering to an entity. Instead, in other embodiments, the disclosed automatic identification and visualization approaches disclosed herein may be used to improve understanding within a medical context, a financial, or even an engineering environment. Thus, it should be understood that the herein discussed approaches are not constrained to any one environment, or problem space, and other contexts, problems, or the like, may also apply the subject innovations.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the subject innovations. As shown, system 100 of FIG. 1 includes local area networks ("LANs")/wide area networks ("WANs")—(network) 111, wireless network 110, client devices 101-105, Opportunity Marketing Device (OMD) 106, and provider service devices 107-108.

One embodiment of a client device usable as one of client devices 101-105 is described in more detail below in conjunction with FIG. 2. Generally, however, client devices 102-104 may include virtually any computing device capable of receiving and sending a message over a network, such as wireless network 110, wired networks, satellite networks, virtual networks, or the like. Such devices include wireless devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as telephones, televisions, video recorders, cable boxes, gaming consoles, personal computers, multiprocessor systems, microprocessor-based or programmable consumer electronics, network PCs, or the like. Further, as illustrated, client device 105 represents one embodiment of a client device operable as a television device. In one embodiment, one or more of client devices 101-105 may also be configured to operate over a wired and/or a wireless network.

Client devices 101-105 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-105 also may include at least one other client application that is configured to receive information and other data from another computing device. The client application may include a capability to provide and receive textual content, multimedia information, or the like. The client application may further provide information that identifies itself, including a type, capability, name, or the like. In one embodiment, client devices 101-105 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

In one embodiment, client devices 101-105 may further provide information useable to detect a location of the client device. Such information may be provided in a message, or sent as a separate message to another computing device.

Client devices 101-105 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-105 may further be configured to include a client application that enables the user to log into a user account that may be managed by another computing device. Information provided either as part of a user account generation, a purchase, or other activity may result in providing various customer profile information. Such customer profile information may include, but is not limited to purchase history, current telecommunication plans about a customer, and/or behavioral information about a customer and/or a customer's activities. Further, some customer profile information may include characteristics about the customer, including for example, age, gender, income, residence location, and/or any of a variety of other information. In at least some embodiments, the various characteristics (or attributes) that comprise customer profile information for one customer may be different from those for another customer, although it need not be different. Moreover, times in which the customer profile information is collected, updated, and/or otherwise revised may be different between customers, or the same.

Wireless network 110 is configured to couple client devices 102-104 with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 111 couples OMD 106, provider service devices 107-108, and client devices 101 and 105 with other computing devices, and allows communications through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 111 includes any communication method by which information may travel between computing devices.

One embodiment of OMD 106 is described in more detail below in conjunction with FIG. 3. Briefly, however, OMD 106 includes virtually any network computing device that is configured to proactively and contextually target offers to customers based on an automatic identification of important and/or interesting characteristics (attributes) of clusters, members or entities within a cluster, and/or the like as described in more detail below in conjunction with FIG. 5.

Devices that may operate as OMD 106 include, but are not limited to personal computers, desktop computers, multiprocessor systems, microprocessor-based or programmable consumer electronics, network PCs, servers, network appliances, and the like.

Although OMD 106 is illustrated as a distinct network device, the invention is not so limited. For example, a plurality of network devices may be configured to perform the operational aspects of OMD 106. For example, data collection might be performed by one or more set of network devices, while entity behavior classifications, and/or reporting interfaces, and/or the like, might be provided by one or more other network devices.

Provider service devices 107-108 include virtually any network computing device that is configured to provide to OMD 106 information including networked services provider information, customer information, customer profile information, and/or other context information for use in generating and selectively pushing or otherwise presenting a customer with targeted customer offers. In some embodiments, provider service devices 107-108 may provide various interfaces, including, but not limited to those described in more detail below in conjunction with FIG. 4.

Illustrative Client Environment

Figure 2:
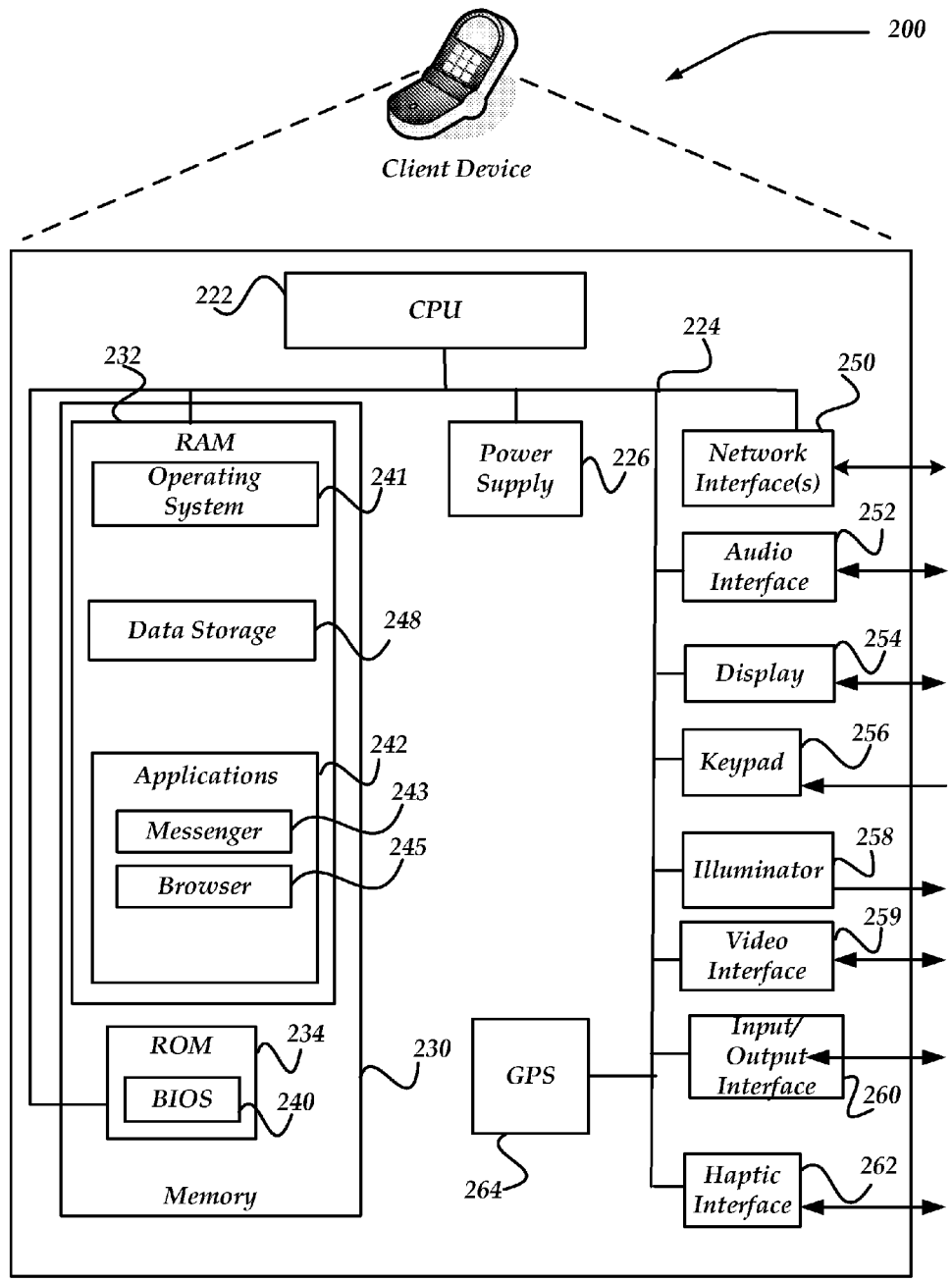
FIG. 2 shows one embodiment of a client device that may be included in a system implementing the techniques.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geopositioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client operating system, for example, such as Windows Mobile™, PlayStation 3 System Software, the Symbian® operating system, or the like. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, purchase history information, user demographic information, behavioral information, user (customer) profile information or the like. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols. Messenger 243 and/or browser 245 may be employed by a user of client device 200 to receive selectively targeted offers of a product/service based on entity behavior classifications.

Illustrative Network Device Environment

Figure 3:
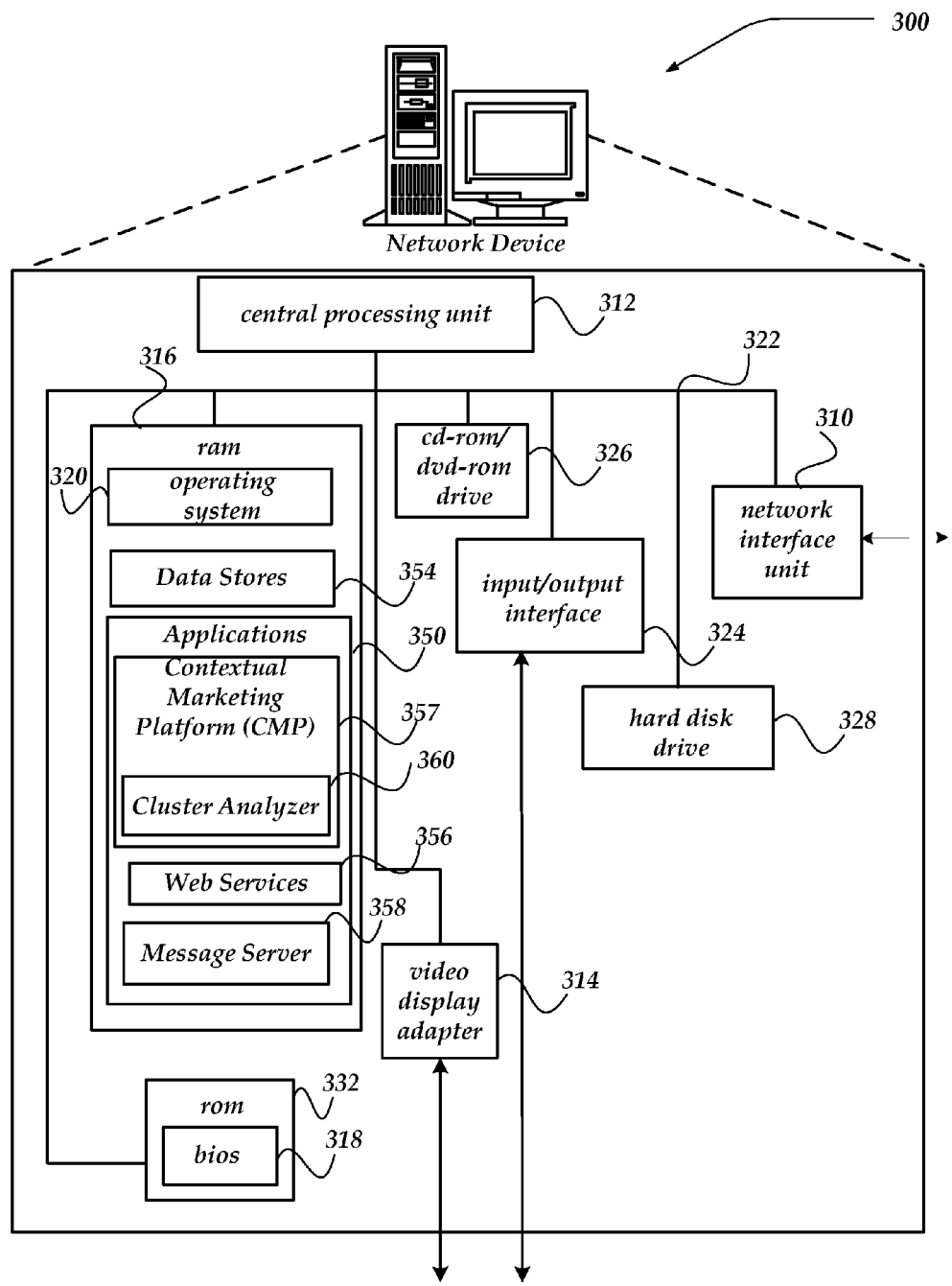
FIG. 3 shows one embodiment of a network device that may be included in a system implementing the techniques.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, OMD 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable device, namely computer storage devices. Computer readable storage devices may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory, physical devices which can be used to store the desired information and which can be accessed by a computing device.

The mass memory also stores program code and data. For example, mass memory might include data store 354. Data store 354 may be include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, customer profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, games, media streaming or multicasting, and so forth. Applications 350 may include web services 356, Message Server (MS) 358, and Contextual Marketing Platform (CMP) 357. As shown, CMP 357 includes Cluster Analyzer (CA) 360.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In one embodiment, web services 356 might interact with CMP 357 to enable a networked services provider to track customer behavior, and/or provide contextual offerings based on an automatic analysis of clustered entities within a dataset of customers to identify important groupings in the dataset.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, Session Initiation Protocol (SIP), or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. In one embodiment, message server 358 may also be configured to interact with CMP 357 and/or web services 356 to provide various communication and/or other interfaces useable to receive provider, customer, and/or other information useable to determine and/or provide contextual customer offers.

One embodiment of CMP 357 is described further below in conjunction with FIG. 4. However, briefly, CMP 357 is configured to receive various historical data from networked services providers about their customers, including customer profiles, billing records, usage data, purchase data, types of mobile devices, and the like. CMP 357 may then perform analysis including using various mechanisms to generate clusters from a dataset of characteristics (attributes) that describe entities with the dataset. In one embodiment, CMP 357 employs Cluster Analyzer 360 to receive the dataset and clustering of the entities within the dataset, and to automatically identify and at least optionally provide a visualization of important clusters, and/or attributes about a given entity, and/or cluster. The resulting identification may then be used to subsequently identify a plurality of occasions (or contexts) when it may be desirable to interact with any particular customer.

CMP 357 monitors ongoing historical and/or real-time data from the networked services provider or external sources to detect or predict within a combination of a plurality of confidence levels, when an occasion is likely to occur for particular customers. Then, based on a detected or predicted occurrence of an occasion for a customer, CMP 357 may select an offer targeted to the customer. The selected offer may then be presented to the customer. However, in one embodiment, CMP 357 might determine that no offer is to be presented to the customer based in part on none of the available offers having a likelihood of being accepted by the customer that exceeds a given threshold. In this manner, the customer is selectively presented with an offer at a time, location, and in an entity behavior classification defined situation when they are predicted to be most emotionally receptive to the offering, while avoiding sending offers that are likely to not be accepted during the given occasion by the customer. In one embodiment, the given threshold is selected for each customer based on the customer's previous purchases for similar products/services, and the like.

Illustrative Time Series-Based Marketing Architecture

Figure 4:
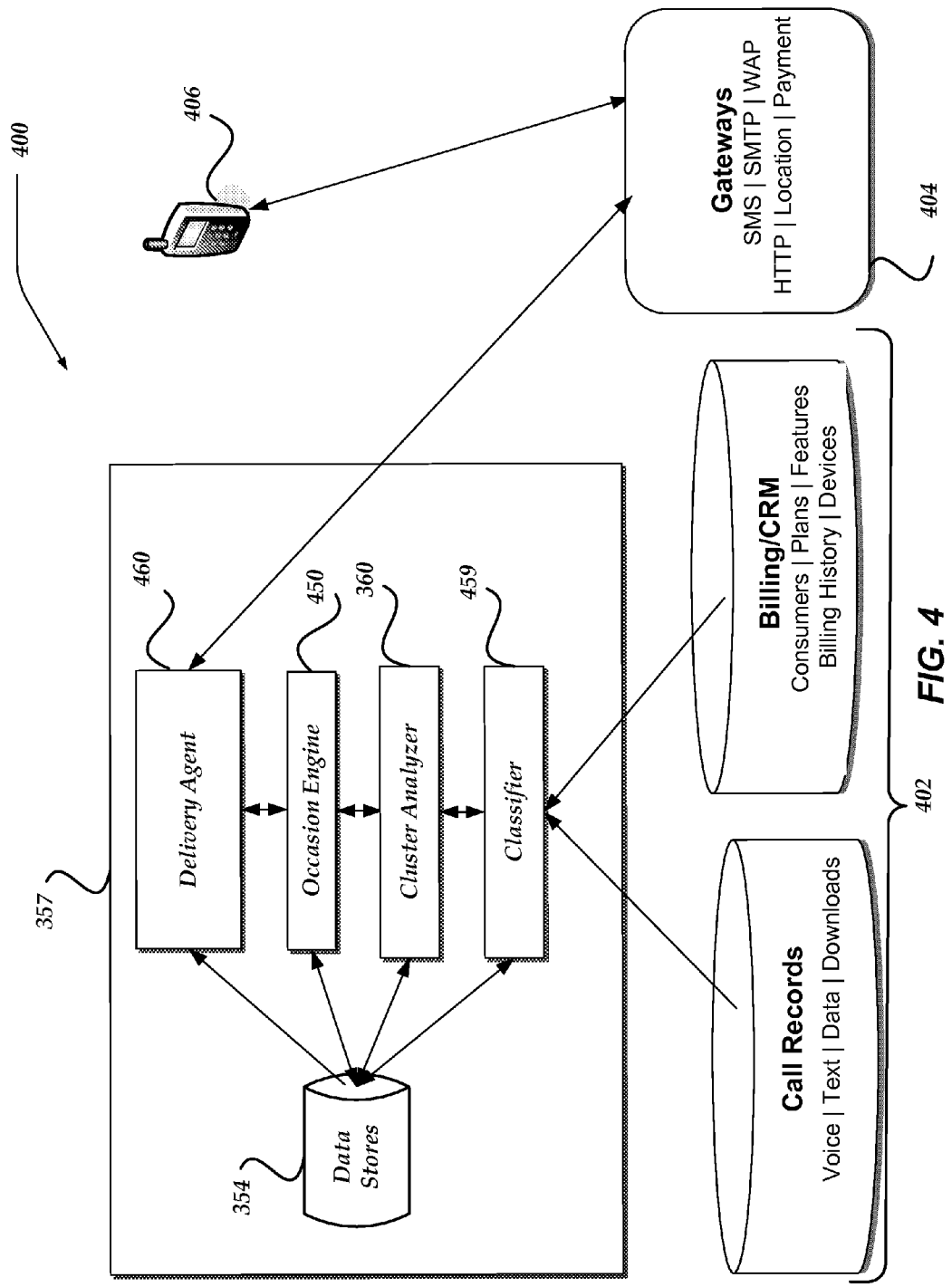
FIG. 4 shows one embodiment of a contextual marketing architecture using automatic identification of important groups.

FIG. 4 shows one embodiment of an architecture useable to perform contextual occasion marketing for contextual offers to be delivered to the customer based on detection of an occasion occurrence for the customer. Architecture 400 of FIG. 4 may include many more components than those shown. The components shown, however, are sufficient to disclose an illustrative embodiment for practicing the invention. Architecture 400 may be deployed across components of FIG. 1, including, for example, OMD 106, client devices 101-105, and/or provider services 107-108.

Architecture 400 is configured to make selection decisions from unsupervised prioritization of cluster information of historical networked services provider's customer usage records, billing data, and the like. Occasions are identified based on the analytics, and monitored to identify and/or predict their occurrence for customers. Offers to the customer during the occurrence of an occasion are optimized according to a customer's interests and preferences as determined by the historical data and the nature of the occasion. Each offer is directed to be optimized to resonate with the customer—highly targeted, relevant, and timely. At the same time, in one embodiment, if for a given customer it is determined that no offer is likely to be accepted by the customer for a given occasion, then no offer is delivered to the customer. In this manner, the customer is not overwhelmed with unnecessary and undesired offerings. Such unnecessary offerings might be perceived by the customer as spam, potentially resulting in decreasing receptivity by the customer to future offers.

In any event, not all the components shown in FIG. 4 may be required to practice the invention and variations in the arrangement and type of the components may be made without departing from the spirit or scope of the subject innovation. As shown, however, architecture 400 includes a CMP 357, networked services provider (NSP) data stores 402, communication channel or communication channels 404, and client device 406.

Client device 406 represents a client device, such as client devices 101-105 described above in conjunction with FIGS. 1-2. NSP data stores 402 may be implemented within one or more services 107-108 of FIG. 1. As shown, NSP data stores 402 may include a Billing/Customer Relationship Management (CRM) data store, and a Network Usage Records data store. However, the subject innovation is not limited to this information, and other types of data from networked services providers may also be used. The Billing/CRM data may be configured to provide such historical data as a customer's profile, including their billing history, customer service plan information, service subscriptions, feature information, content purchases, client device characteristics, and the like. Usage Records may provide various historical data including but not limited to network usage record information including voice, text, internet, download information, media access, and the like. NSP data stores 402 may also provide information about a time when such communications occur, as well as a physical location for which a customer might be connected to during a communication, and information about the entity to which a customer is connecting. Such physical location information may be determined using a variety of mechanisms, including for example, identifying a cellular station that a customer is connected to during the communication. From such connection location information, an approximate geographic or relative location of the customer may be determined.

CMP 357 is streamlined for occasion identification and presentation. Only a small percentage of the massive amount of incoming data might be processed immediately. The remaining records may be processed from a buffer to take advantage of processing power efficiently over a full 24 hours. As the raw data is processed into predictive scores, times, statistics and other supporting data, it may be discarded from the system, in one embodiment, leaving a sustainable dataset that scales as a function of consumer base.

Communication channels 404 include one or more components that are configured to enable network devices to deliver and receive interactive communications with a customer. In one embodiment, communication channels 404 may be implemented within one or more of provider services 107-108, and/or client devices 101-105 of FIG. 1, and/or within networks 110 and/or 111 of FIG. 1.

The various components of CMP 357 are described further below. Briefly, however, CMP 357 is configured to receive customer data from NSP data stores 402. CMP 357 may then employ Classifier 459 to classify entities, such as into various clusters. CMP 357 may further use Cluster Analyzer 360 to further identify and/or provide visualization of important groupings of entities based on the dataset comprising customer information and attributes about the customers, as well as information about the clustering of the customers (entities within the dataset). CMP 357 may then provide the identification of important entities, and/or clusters to occasions engine 450 to determine to whom and when to provide an offering to a customer. The results of occasions engine 450 may be provided to a customer through deliver agent 460.

Generalized Operation

Figure 5:
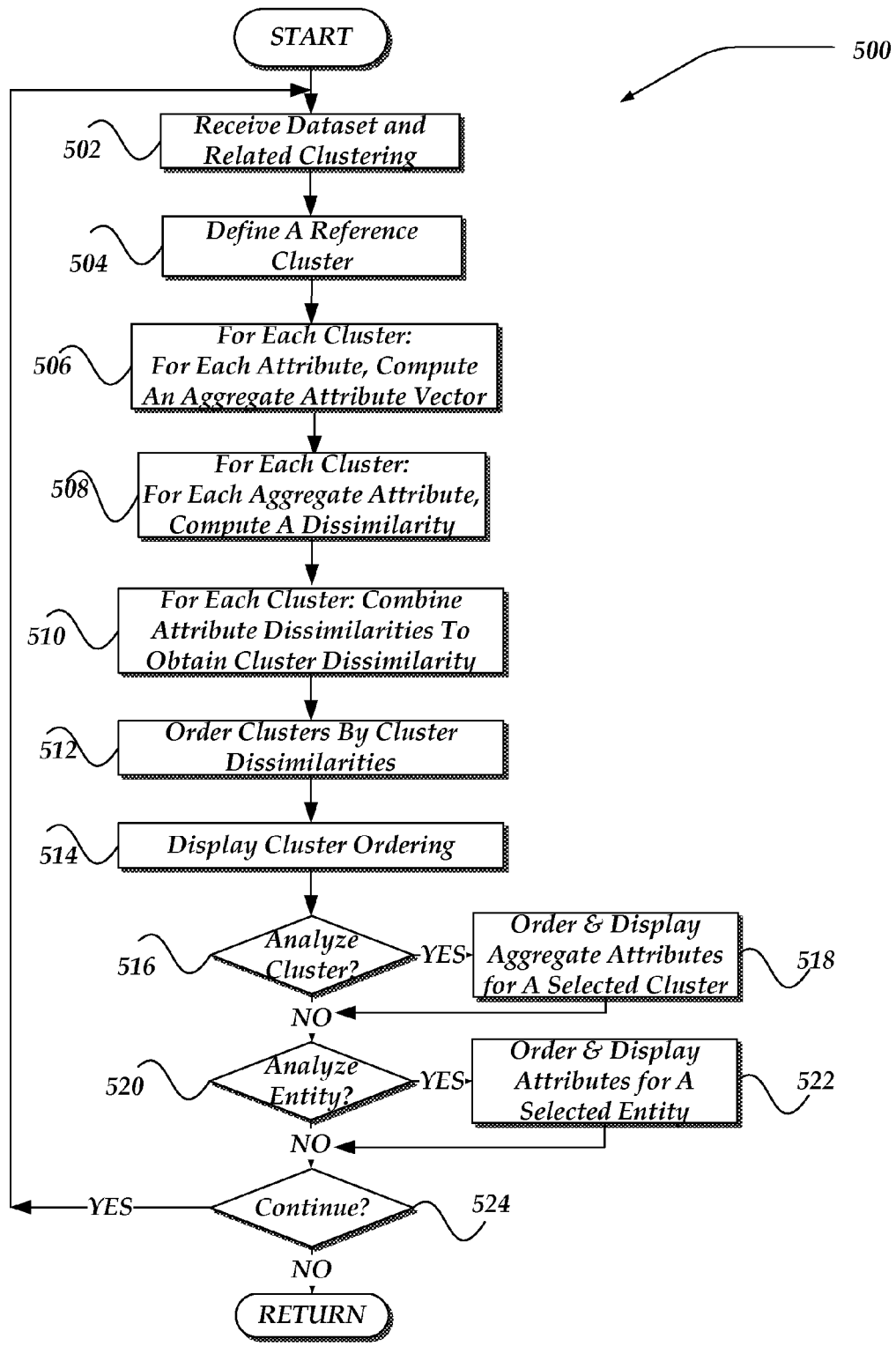
FIG. 5 shows one embodiment of a flow diagram of a process for identifying and visually displaying interesting and important groupings from a given collection of candidate groups or clusters with a dataset.

The operation of certain additional general aspects of the subject innovation will now be described with respect to FIGS. 5-8. FIG. 5 shows one embodiment of a flow diagram of a process for identifying and visually displaying interesting and important groupings from a given collection of candidate groups or clusters with a dataset. Process 500 of FIG. 5 may be implemented and executed within OMD 106 of FIG. 1, for example. Process 500 might, for example, be executed within Cluster Analyzer 360 of FIG. 3. However, as discussed above, process 500 may also be implemented and executed in other computing devices, within environments or contexts other than that which is shown in FIG. 1.

In any event, process 500 may be arranged to receive a dataset and related clustering information about entities within the dataset to provide unsupervised visualization prioritization. Thus, process 500 begins, after a start block, at block 502, where the dataset and given clustering information is received about the dataset. As defined herein, each datum in the dataset is an entity. Each entity is uniquely described by an entity identifier (ID) and by a set of attributes. Other names for attributes are characteristics, features, and predictors, each of which may be used interchangeably herein. A non-limiting, non-exhaustive example of an entity is a cell-phone user, identified by a unique ID. Example attributes include gender, age, usage statistics such as mean, maximum, minimum, standard deviation of voice call duration, number of text messages per day, internet data downloaded or uploaded. Clearly, other attributes may also be used. Further, attributes may be scalar values, or multi-dimensional.

Moreover, as used herein, a clustering is a partition of the dataset into subsets. Other names for clustering include grouping and segmentation, each of which may be used interchangeably. The subsets are called clusters, groups, or segments. Each cluster contains a number of entities and each entity may belong to one cluster or to multiple clusters. Moreover, in at least some embodiments, at least one attribute might not be defined for at least one entity within the dataset, but defined for another entity within the dataset.

Process 500 flows next to block 504, where a reference cluster is defined. A specific cluster is either pre-selected as being the reference cluster to which all other clusters are compared, or is defined by the end-user, or by another mechanism, or process. For example, the reference cluster could be the cluster obtained from the union of all clusters—which comprises all entities—or the union of some of the clusters or a single cluster. However, in other embodiments, the reference cluster might comprise entities from other than any of the entities within the dataset. That is, the reference cluster might be provided from a different dataset.

Processing flows next to block 506, where for each given cluster and for the reference, for each attribute, an aggregate attribute value is computed. Examples of aggregate attributes include average, median, maximum, and minimum across all the entities in a given cluster. For a scalar-valued attribute, the aggregate will be a scalar; for vector-valued attributes, the corresponding aggregate will be a vector. Examples of vector-valued attributes are histograms of the distribution of attributes.

Moving to block 508, for each cluster, a dissimilarity is computed for each aggregate attribute to its corresponding aggregate attribute in the reference cluster. The result is a list of dissimilarities, one per aggregate attribute that captures each attribute's dissimilarity from the corresponding aggregate in the reference cluster. The choice of dissimilarity is flexible, and either dissimilarities or similarities can be used. Examples of dissimilarities and similarities include, but are not limited to a Kullback-Leibler (KL) divergence; Battacharrya distance; MSE (mean squared error); Lp-norms, which include an L1 distance (so-called Manhattan or cityblock distance), an L2 distance (so-called Euclidean distance), and higher-order norms for p>2; or VDM (valued difference metric).

Continuing to block 510, the attribute dissimilarities are combined into one cluster dissimilarity. The result of this step is a single number that captures the cluster's dissimilarity from the reference cluster. Examples of how to combine the attribute dissimilarities include Mean, Sum, Maximum, Minimum, Lp-norms, or weighted averages.

Figure 6A:
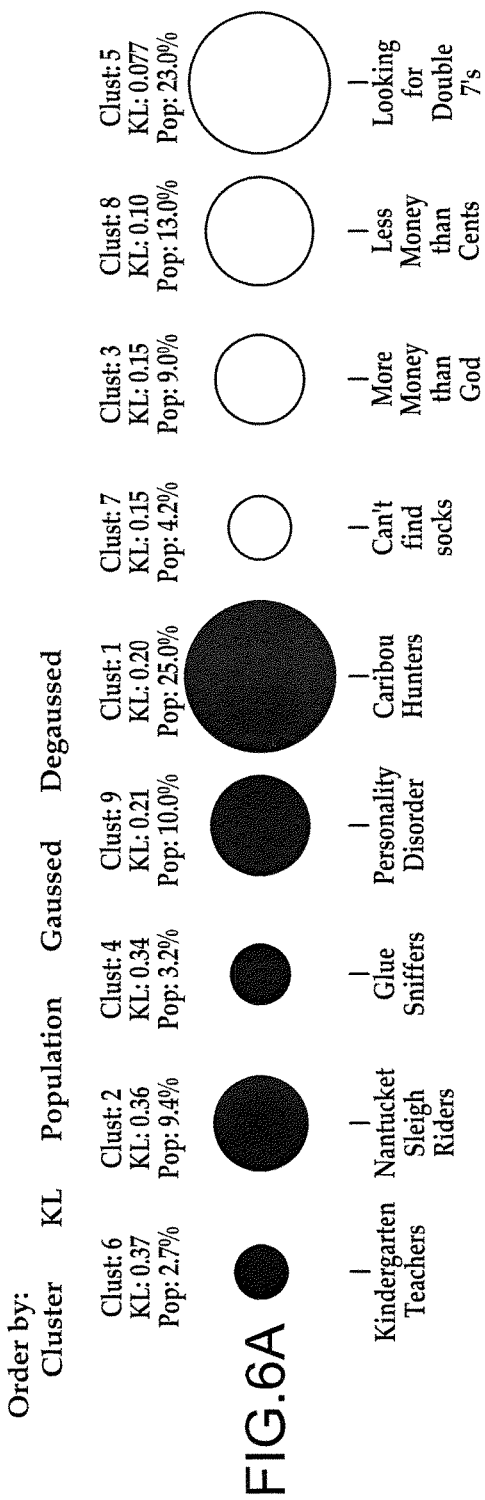
FIGS. 6A-6B (collectively "FIGURE 6") show one non-limiting, non-exhaustive example of a cluster visualization illustrating important clusters or groupings.
Figure 6B:
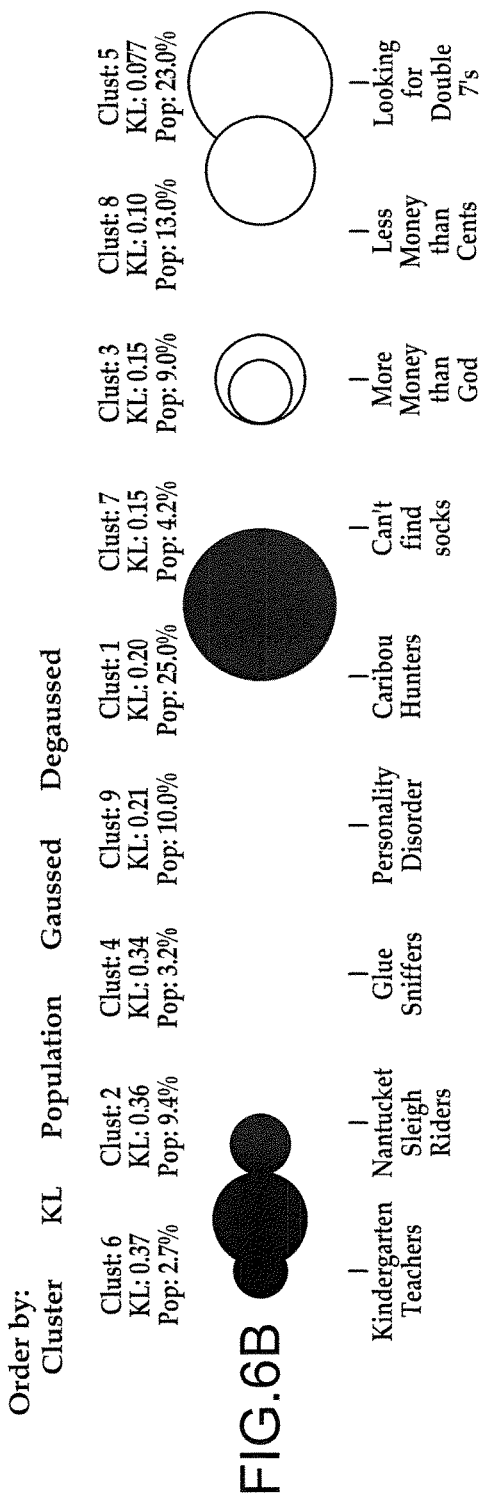

Flowing next to block 512, the clusters are ordered based on their dissimilarity to the reference. The ordering function may be chosen by the user, and can be ascending or descending. Continuing to block 514, the ordering may be displayed visually, such as illustrated in FIG. 6. The visualization of the ordered clusters may be such as to display the ordered clusters side-by-side on a horizontal line, left-to-right, in order of dissimilarity from the reference. Each cluster may be represented by a circle with area proportional to the size of the cluster, and the circle can optionally be color-coded, where the color represents a degree of dissimilarity according to a user-chosen colormap, as shown in FIG. 6(a) (as colored or non-colored circles). In addition, each cluster may be annotated with labels that convey ancillary information. For example, in FIG. 6(a), Cluster 1 is annotated with its relative size (25%) measured by the proportion of entities that fall into that cluster relative to the total number of entities, and by the KL dissimilarity of that cluster relative to the chosen reference. Each cluster may also be annotated with a descriptive user-chosen name, such as "Caribou Hunters" for Cluster 1, or the like. In another embodiment, such as shown in FIG. 6(b), the dissimilarity value may be assigned to the x-axis of the above-described visualization, which results in clusters being grouped by their dissimilarity value. In yet other embodiments, the clusters may be displayed on a scatter plot (not shown) where the y-axis measures size of cluster and the x-axis measures degree of dissimilarity from the reference group.

Process 500 flows next to decision block 516, where further analysis of the dataset might be performed. Thus, at decision block 516, a determination is made whether to perform an analysis on a given cluster. If so, processing flows to block 518; otherwise processing flows to decision block 520.

At block 518, a user may choose a cluster, and for the chosen cluster, an ordering and visualization of its aggregate attributes according to the attribute dissimilarities may be provided. In some embodiments, the display can include the corresponding reference aggregates for visual comparison. In some embodiments, when the number of attributes is large, it is possible to limit the visualization to the top-N most differentiating attributes of the selected cluster, based on dissimilarity, relative to the previously defined reference. The N most differentiating attributes for a given cluster may be different from the top N attributes that differentiate a different cluster from the reference. Moreover, as noted elsewhere, different attributes may be used for determining dissimilarities than those attributes used in creating the clusters.

Figure 7A:
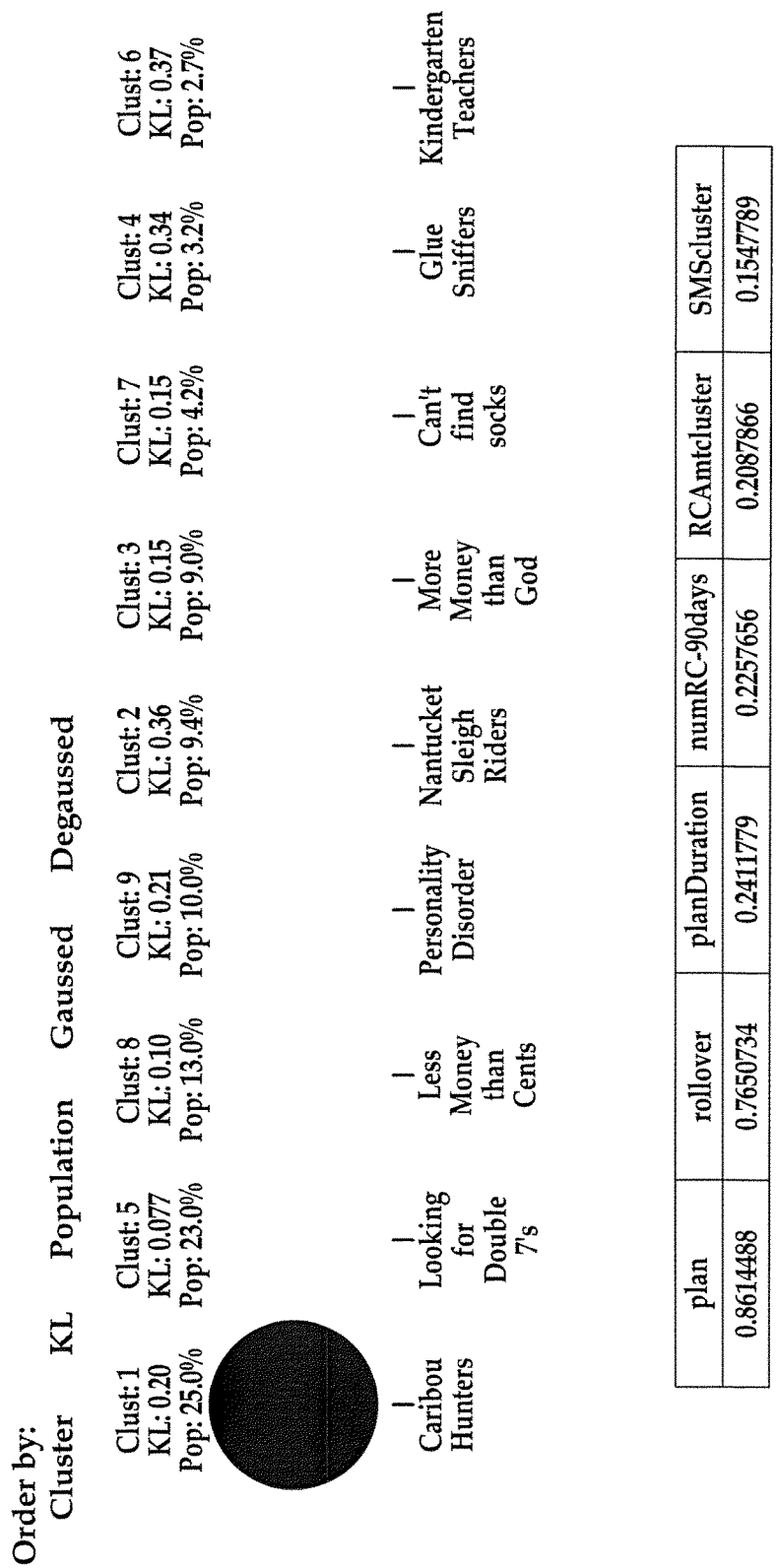
FIGS. 7A-7B (collectively "FIGURE 7") show one non-limiting, non-exhaustive example of a cluster visualization illustrating important attributes within a given cluster.
Figure 7B:
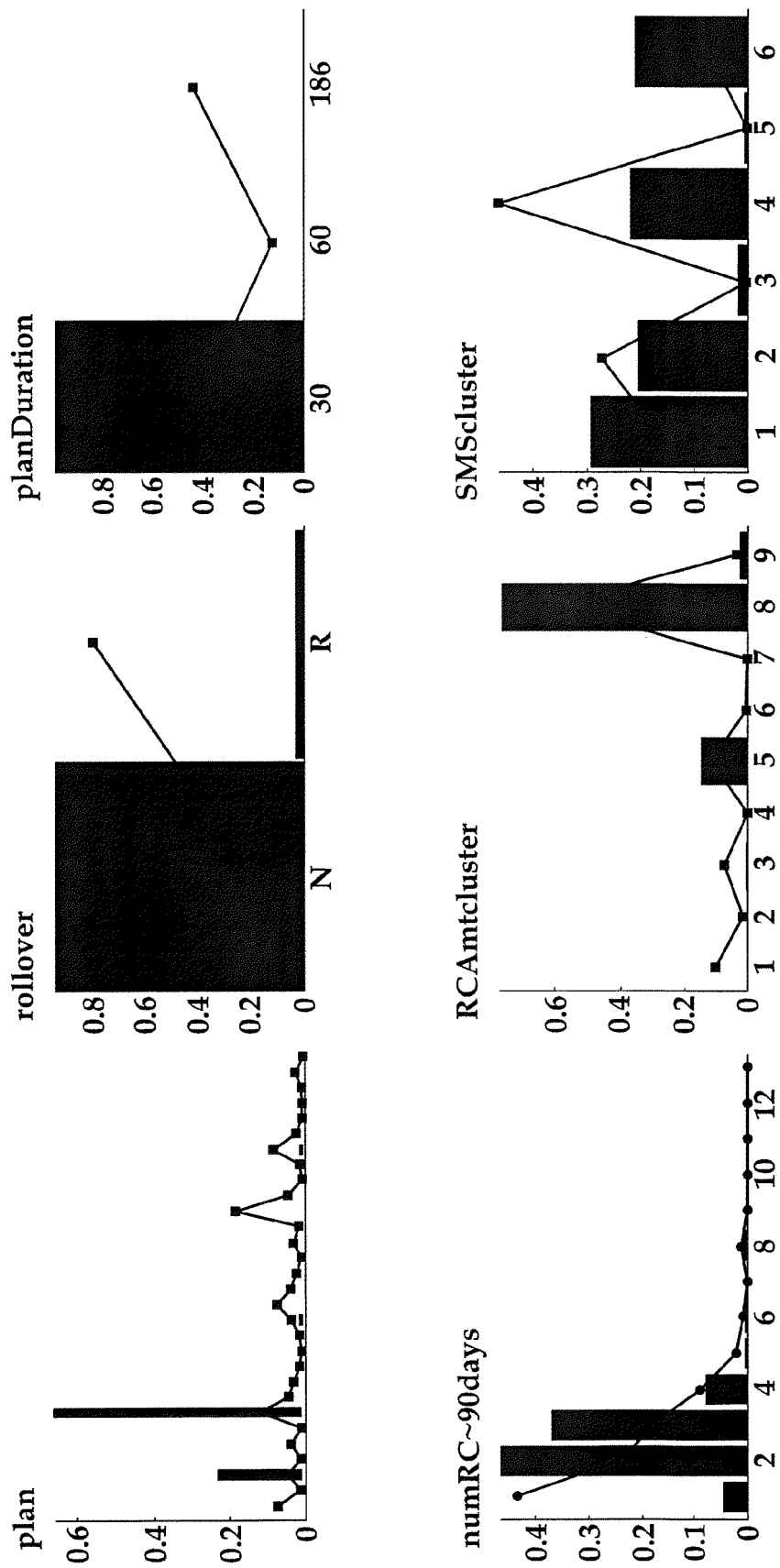

FIG. 7 shows one non-limiting, non-exhaustive example of a cluster visualization illustrating the 6 most differentiating attributes within a given cluster. For example, as shown for the chosen cluster 1, the top-6 most differentiated attributes as determined by how much they contributed to the measure of dissimilarity for the cluster, are: "plan", "rollover", "planDuration", "numRC-90days", "RCAmntcluster", and "SMScluster." In one embodiment, the attribute charts are presented in decreasing order of differentiation, so that in FIG. 7 "plan" contributes more to the overall cluster dissimilarity than "rollover", and "rollover" contributes more than "planDuration" and so on. Illustrated for each attribute are cluster-specific data, indicated by the bars in the plots, and corresponding data for the attribute from the reference cluster, indicated by the lines plot.

The idea behind being able display the top-N distinguishing attributes is that it is possible to determine and surface automatically to a user what it is about a cluster that differentiates its members relative to the population as a whole. These top-N attributes may be defined then as those interesting and/or important attributes. It is the differentiating elements that then goes on to provide insight to the user on what action or treatment might be made to address that specific segment of the underlying population, or to explain why a certain type of interaction with that segment of the population may not be appropriate or relevant to it.

Block 518 could be repeated by selecting different clusters for further analysis. In any event, upon completion, processing flows to decision block 520, where a determination is made whether to perform analysis for a chosen entity. If so, processing flows to block 522; otherwise, processing flows to decision block 524.

Figure 8:
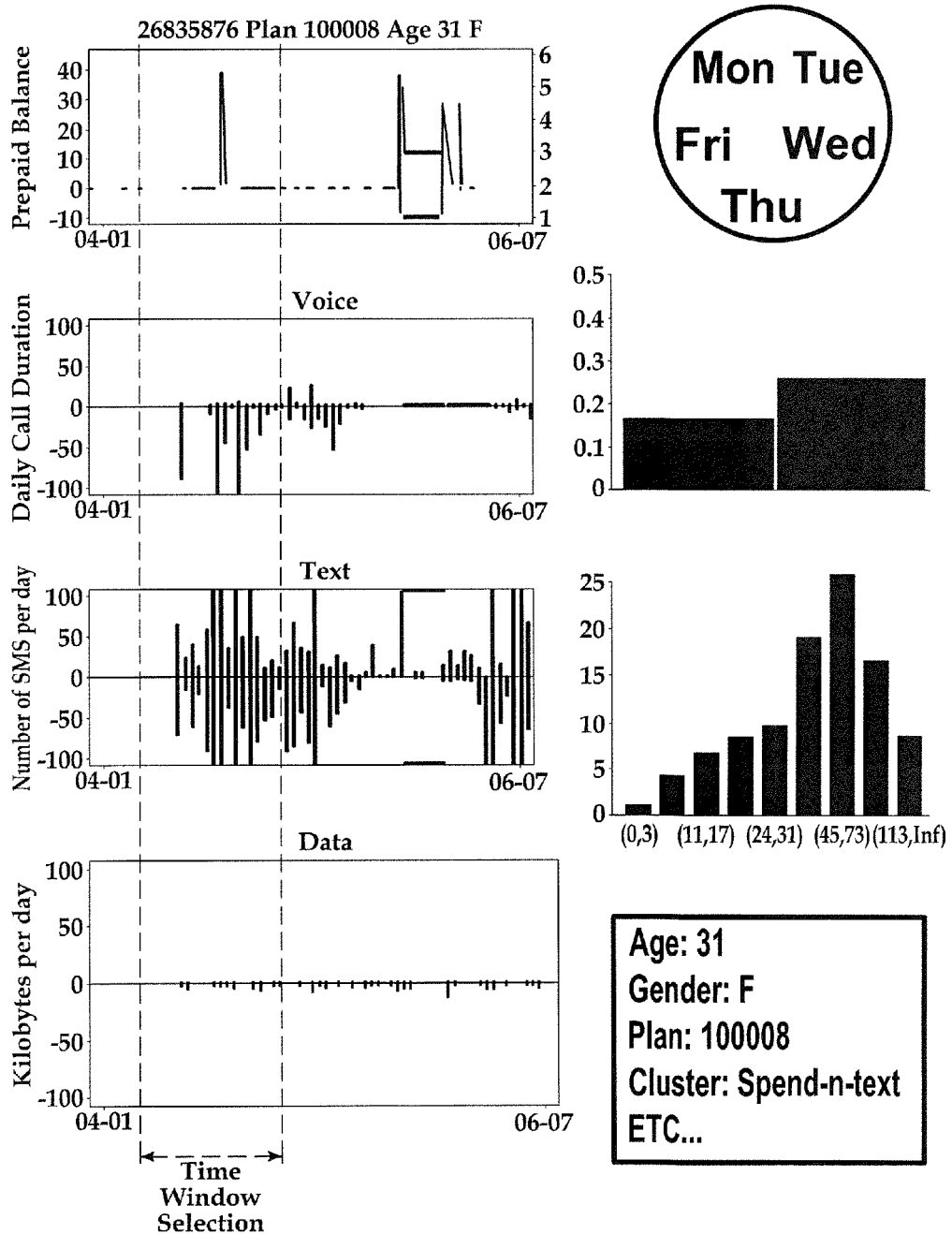
FIG. 8 shows one non-limiting, non-exhaustive example of a visualization of interesting attributes for a customer within a given cluster.

At block 522, for a chosen entity, in one embodiment, an ordering and display may be provided based on the chosen attributes according to their dissimilarities to the reference aggregate attributes. In another embodiment, the ordering and display may be according to the attributes' dissimilarities to the aggregate attributes of any chosen cluster, including the chosen entity's cluster. In some embodiments, the display can include the corresponding reference aggregates for visual comparison. FIG. 8 illustrates one non-limiting, non-exhaustive example of a visualization of interesting attributes for a customer (entity) within a given cluster.

At decision block 524, a determination is made whether to continue to perform unsupervised visualization prioritization for entities and/or clusters. If so, processing flows back to block 502; otherwise, processing may return to a calling process.

It will be understood that each block of the flowcharts, and combinations of blocks in the flowcharts, can be implemented by computer program instructions. These program instructions may be provided to a processor to produce a machine, such that the instructions, which execute on the processor, create means for implementing the actions specified in the block or blocks. The computer program instructions may be executed by a processor to cause a series of operational steps to be performed by the processor to produce a computer-implemented process such that the instructions, which execute on the processor to provide steps for implementing the actions specified in the block or blocks. The computer program instructions may also cause at least some of the operational steps shown in the blocks to be performed in parallel. Moreover, some of the steps may also be performed across more than one processor, such as might arise in a multi-processor computer system. In addition, one or more blocks or combinations of blocks in the illustration may also be performed concurrently with other blocks or combinations of blocks, or even in a different sequence than illustrated without departing from the scope or spirit of the subject innovation.

Accordingly, blocks of the illustration support combinations of means for performing the specified actions, combinations of steps for performing the specified actions and program instruction means for performing the specified actions. It will also be understood that each block of the illustration, and combinations of blocks in the illustration, can be implemented by special purpose hardware-based systems, which perform the specified actions or steps, or combinations of special purpose hardware and computer instructions.

It should be noted that the above examples are not to be construed as limiting the scope of the subject innovation. Rather, they are merely provided to illustrate non-limiting examples of possible uses of the subject innovation. Furthermore, the examples presented are not exhaustive examples. The above specification, examples, and data provide a complete description of the manufacture and use of the composition of the subject innovation. Since many embodiments of the subject innovation can be made without departing from the spirit and scope of the subject innovation, the subject innovation resides in the claims hereinafter appended.

What is claimed as new and desired to be protected by Letters Patent of the United States is:

1. A network device, comprising:
  a transceiver to send and receive data over a network; and
  a processor that is operative to perform actions, comprising:
    receiving data having values for a plurality of attributes for a plurality of entities, wherein each entity is a user of a cell phone and is described by a set of attribute values that include values of the user for one or more types of demographic information and for one or more types of use of communication capabilities of the cell phone; and
    providing, via unsupervised learning, a prioritized visualization of a plurality of clusters that are generated by machine analysis of multiple attributes from the received data corresponding to the one or more types of demographic information and to the one or more types of use of communication capabilities of the cell phone, wherein each cluster of the plurality includes a distinct group of multiple entities of the plurality of entities, the providing including:
      computing, for a first cluster of the plurality of clusters and for each of the multiple attributes, an aggregate value of the attribute for the first cluster by combining values of the attribute for the multiple entities in the first cluster;
      computing, for a reference cluster of the plurality of clusters and for each of the multiple attributes, an aggregate value of the attribute for the reference cluster by combining values of the attribute for the multiple entities in the reference cluster;
      computing, for each of the multiple attributes, an attribute dissimilarity between the aggregate values of the attribute for the first cluster and the reference cluster, and combining the attribute dissimilarities for the multiple attributes to determine a single cluster dissimilarity between the first cluster and the reference cluster;
      determining two or more attributes of the multiple attributes that are most differentiating between the first cluster and the reference cluster based on the computed attribute dissimilarity for each of the multiple attributes; and
      displaying on a display device information indicating the determined cluster dissimilarity between the first cluster and the reference cluster, including information about the determined two or more attributes to indicate how the multiple entities in the first cluster are differentiated from the multiple entities in the reference cluster.

2. The network device of claim 1 wherein the providing of the prioritized visualization of the plurality of clusters includes generating the plurality of clusters based on the multiple attributes, and wherein determining of the single cluster dissimilarity between the first cluster and the reference clusters includes using at least one attribute separate from the multiple attributes used in the generating of the plurality of clusters.

3. The network device of claim 2 wherein the reference cluster further includes at least one additional entity with related attribute values that are not included in the received data.

4. The network device of claim 3 wherein the related attribute values for the at least one additional entity include values for multiple additional entities for an additional attribute distinct from the multiple attributes, wherein the multiple entities in the first cluster do not include any values for the additional attribute, and wherein the determining of the single cluster dissimilarity between the first and reference clusters is further based in part on an aggregate value for the reference cluster for the additional attribute.

5. The network device of claim 2 wherein at least one of the multiple attributes is a vector-valued attribute.

6. The network device of claim 2 wherein the determining of the single cluster dissimilarity between the first cluster and the reference cluster is performed at least in part using a Kullback-Leibler divergence.

7. The network device of claim 1 wherein the processor is operative to perform further actions that include:
  determining, for a selected entity from the multiple entities of the first cluster, and for each of at least some of the multiple attributes, a further attribute dissimilarity between a value of the attribute for the selected entity and the aggregate value of the attribute for the first cluster;
  displaying additional information on the display device indicating the determined further attribute dissimilarities for the at least some attributes between the selected entity and the first cluster; and
  displaying further information on the display device about a subset of the multiple attributes that are most differentiating between the first cluster and the reference cluster based on contribution to the determined single cluster dissimilarity, wherein the displayed further information indicates how the multiple entities in the first cluster are differentiated from the multiple entities in the reference cluster.

8. The network device of claim 1 wherein the two or more attributes include a set of numerical vectors interpreted as at least one of probability density functions or probability mass functions over one or more characteristics, and wherein the determining of the single cluster dissimilarity between the first cluster and the reference clusters includes comparing distributions of the one or more characteristics for the first cluster and the reference clusters.

9. The network device of claim 1 wherein the plurality of clusters include multiple additional clusters distinct from the first cluster and the reference cluster, wherein the processor is operative to perform further actions that include determining, for each of the multiple additional clusters, an additional single cluster dissimilarity between the additional cluster and the reference cluster, and wherein the displaying of the information further includes displaying an ordering of the multiple additional clusters that represents the determined additional single cluster dissimilarities between the multiple additional clusters and the reference cluster.

10. The network device of claim 1 wherein the first cluster includes multiple additional entities distinct from the selected entity, wherein the processor is operative to perform further actions that include determining, for each of the multiple additional entities, one or more additional entity dissimilarities between the additional entity and the first cluster, and wherein the displaying of the information further includes displaying an ordering of the multiple additional entities that represents the determined additional entity dissimilarities between the multiple additional entities and the first cluster.

11. A non-transitory computer readable medium having computer-executable instructions stored thereon that, in response to execution by a computing device, cause the computing device to perform operations including:
   receiving data having values for a plurality of attributes for a plurality of entities, wherein each entity is a user of a cell phone and is described by a set of attribute values that include values for one or more types of demographic information and for one or more types of use of communication capabilities of the cell phone; and
   providing, via unsupervised learning, a prioritized visualization of a plurality of clusters that are generated by machine analysis of multiple attributes from the received data corresponding to the one or more types of demographic information and to the one or more types of use of the communication capabilities of the cell phone, wherein each cluster of the plurality includes a distinct group of multiple entities of the plurality of entities, the providing including:
      computing, for a first cluster of the plurality of clusters and for each of the multiple attributes, an aggregate value of the attribute for the first cluster by combining values of the attribute for the multiple entities in the first cluster;
      computing, for a reference cluster of the plurality of clusters and for each of the multiple attributes, an aggregate value of the attribute for the reference cluster by combining values of the attribute for the multiple entities in the reference cluster;
      computing, for each of the multiple attributes, an attribute dissimilarity between the aggregate values of the attribute for the first cluster and the reference cluster, and combining the attribute dissimilarities for the multiple attributes to determine a single cluster dissimilarity between the first cluster and the reference cluster;
      determining two or more attributes of the multiple attributes that are most differentiating between the first cluster and the reference cluster based on the computed attribute dissimilarity for each of the multiple attributes; and
      displaying on a display device information indicating the determined cluster dissimilarity between the first cluster and the reference cluster, including information about the determined two or more attributes to indicate how the multiple entities in the first cluster are differentiated from the multiple entities in the reference cluster.

12. The non-transitory computer readable medium of claim 11 wherein the computer-executable instructions further cause the computing device to perform operations comprising displaying an ordering of the multiple attributes based on each attribute's dissimilarity between the aggregate value for the attribute for the first cluster and the aggregate value for the attribute for the reference cluster.

13. The non-transitory computer readable medium of claim 11 wherein the computer-executable instructions further cause the computing device to generate the plurality of clusters based on the multiple attributes and on at least one additional attribute that is not used in determining an aggregate attribute value for the first cluster.

14. The non-transitory computer readable medium of claim 11 wherein the computer-executable instructions further cause the computing device to, for a selected entity from the multiple entities of the first cluster, determine one or more attributes of the multiple attributes that are most differentiating between the selected entity and the first cluster, and display further information about the determined one or more attributes to indicate how the selected entity is differentiated from the multiple entities in the first cluster.

15. The non-transitory computer readable medium of claim 14 wherein the one or more attributes include a set of numerical vectors interpreted as at least one of probability density functions or probability mass functions over one or more characteristics, and wherein the determining of the one or more attributes includes computing the attribute dissimilarity for each of the one or more attributes by comparing distributions of the one or more characteristics for the selected entity and the first cluster.

16. The non-transitory computer readable medium of claim 14 wherein the first cluster includes multiple additional entities distinct from the selected entity, wherein the computer-executable instructions cause the computing device to perform further operations including determining, for each of the multiple additional entities, one or more additional attribute dissimilarities between the additional entity and the first cluster, and wherein the displaying of the information further includes displaying an ordering of the multiple additional entities based at least in part on the determined additional attribute dissimilarities between the multiple additional entities and the first cluster.

17. The non-transitory computer readable medium of claim 14 wherein the computed attribute dissimilarities are determined using a Kullback-Leibler divergence, a Battacharrya distance, an mean-squared error, an Lp-norm, or an Euclidean distance.

18. The non-transitory computer readable medium of claim 14 wherein at least one attribute of the two or more attributes is a vector-valued attribute.

19. The non-transitory computer readable medium of claim 14 wherein at least one attribute of the two or more attributes represents a distribution of attributes.

20. The non-transitory computer readable medium of claim 11 wherein the plurality of clusters include multiple additional clusters distinct from the first, and wherein the computer-executable instructions cause the computing device to perform further operations including:
   determining, for each of the multiple additional clusters, and for each of the multiple attributes, an aggregate value of the attribute for the additional cluster by combining values of the attribute for the multiple entities in the additional cluster;

determining, for each of the multiple additional clusters, a single cluster dissimilarity between the additional cluster and the reference cluster based on aggregate values for the multiple attributes for the additional cluster and on aggregate attribute values for the reference cluster; and displaying further information indicating an ordering of the multiple additional clusters that represents the determined single cluster dissimilarities between the multiple additional clusters and the reference cluster.

* * * * *

UNITED STATES PATENT AND TRADEMARK OFFICE
CERTIFICATE OF CORRECTION

PATENT NO.        : 9,659,087 B2
APPLICATION NO.   : 13/831121
DATED             : May 23, 2017
INVENTOR(S)       : Luca Cazzanti et al.

It is certified that error appears in the above-identified patent and that said Letters Patent is hereby corrected as shown below:

In the Claims

Column 20, Lines 47-48:
"17. The non-transitory computer readable medium of claim 14" should read, --17. The non-transitory computer readable medium of claim 11--.

Column 20, Lines 52-53:
"18. The non-transitory computer readable medium of claim 14" should read, --18. The non-transitory computer readable medium of claim 11--.

Column 20, Lines 55-56:
"19. The non-transitory computer readable medium of claim 14" should read, --19. The non-transitory computer readable medium of claim 11--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*